(12) United States Patent
Wang et al.

(10) Patent No.: US 12,430,787 B2
(45) Date of Patent: Sep. 30, 2025

(54) DEEP LEARNING-BASED METHOD FOR PREDICTING SETTLEABILITY OF ACTIVATED SLUDGE

(71) Applicant: Nanjing University, Nanjing (CN)

(72) Inventors: Jinfeng Wang, Nanjing (CN); Jin Wang, Nanjing (CN); Deyuan Dong, Nanjing (CN); Haidong Hu, Nanjing (CN); Bing Wu, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 297 days.

(21) Appl. No.: 18/241,265

(22) Filed: Sep. 1, 2023

(65) Prior Publication Data
US 2025/0078301 A1    Mar. 6, 2025

(51) Int. Cl.
*G06T 7/62* (2017.01)
*C02F 3/12* (2023.01)

(52) U.S. Cl.
CPC .................. *G06T 7/62* (2017.01); *C02F 3/12* (2013.01); *G06T 2207/20084* (2013.01)

(58) Field of Classification Search
CPC ............. G06T 7/62; G06T 2207/20084; G06T 7/0004; C02F 3/12; C02F 3/006
See application file for complete search history.

(56) References Cited

U.S. PATENT DOCUMENTS 10,919,791 B2 * 2/2021 Han .................. G06F 30/27

FOREIGN PATENT DOCUMENTS

KR    20230156506 A  * 11/2023   ............... G06N 3/08

OTHER PUBLICATIONS

Usman Safder Jorge Loy-Benitez, Hai-Tra Nguyen, and ChangKyoo Yoo: "A hybrid extreme learning machine and deep belief network framework for sludge bulking monitoring in a dynamic wastewater treatment process"; Jan. 19, 2022; Journal of Water Process Engineering 46 (2022) 102580; pp. 1-13. (Year: 2022).*
Praewa Wongburi and Jae K. Park: "Prediction of Sludge Volume Index in a Wastewater Treatment Plant Using Recurrent Neural Network"; May 21, 2022; Sustainability 2022, 14, 6276; pp. 1-15. (Year: 2022).*

* cited by examiner

*Primary Examiner* — Siamak Harandi
(74) *Attorney, Agent, or Firm* — MATTHIAS SCHOLL P.C.; Matthias Scholl

(57) ABSTRACT

A deep learning-based method for predicting the settleability of activated sludge includes: (1) collecting a plurality of activated sludge samples, acquiring raw data of images of the plurality of activated sludge samples, cleaning the raw data of the images, and standardizing data sizes of the images; (2) calculating a sludge volume index (SVI) for each of the plurality of activated sludge samples; (3) establishing, by using a ResNet50 deep neural network, a model for predicting the settleability of activated sludge; and (4) predicting the settleability of a target activated sludge using the model established in (3).

10 Claims, 5 Drawing Sheets

|              | Bulking | Non-bulking |
|--------------|---------|-------------|
| Bulking      | 129     | 19          |
| Non-bulking  | 32      | 539         |

FIG. 5

|              | Bulking | Non-bulking |
|--------------|---------|-------------|
| Bulking      | 158     | 11          |
| Non-bulking  | 80      | 470         |

FIG. 6

DEEP LEARNING-BASED METHOD FOR PREDICTING SETTLEABILITY OF ACTIVATED SLUDGE

CROSS-REFERENCE TO RELATED APPLICATIONS

The contents of Chinese Patent Application No. 202210433941.9 filed Apr. 24, 2022 and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of wastewater treatment technology, and more particularly, to a deep learning-based method for predicting the settleability of activated sludge.

Activated sludge process is widely utilized in urban wastewater treatment. However, within its biological treatment system, sludge bulking frequently arises. The phenomenon results in effects such as weakened sludge structure, reduced density, compressed settleability, and challenges in effectively separating sludge from water. Consequently, these issues have an impact on the quality of the discharged water. When sludge bulking occurs, a significant duration is required for adjustments in order to bring a wastewater treatment plant back to its regular operational state. Within the monitoring regimen of the sewage treatment plant, both settled Sludge volume (SV) and Mixed Liquor Suspended Solid (MLSS) concentration, which serve as measures of activated sludge settleability, are monitored daily. The daily monitoring facilitates the calculation of the Sludge Volume Index (SVI) and assessment of the settleability of the activated sludge. Hence, ensuring prompt, effective, and precise monitoring of activated sludge settleability can offer advance notification regarding sludge bulking, thereby ensuring the stable operation of the wastewater treatment plant.

At present, identifying sludge bulking problems typically involves conducting laboratory tests to determine the SVI. The SVI determination method is simple but time-consuming. Alternatively, in practical situations, the settleability of the activated sludge can also be assessed through microscopic observation, which is a simpler and quicker method. However, the method relies on human observation, introducing the potential for subjective errors that compromise the accuracy of the determination results.

SUMMARY

To solve the aforesaid problems, the disclosure provides a deep learning-based method for predicting the settleability of activated sludge.

The deep learning-based method comprises:
(1) collecting a plurality of activated sludge samples, acquiring raw data of images of the plurality of activated sludge samples, cleaning the raw data of the images, and standardizing data sizes of the images;
(2) calculating a sludge volume index (SVI) for each of the plurality of activated sludge samples;
(3) establishing, by using a ResNet50 deep neural network, a model for predicting the settleability of activated sludge; and
(4) predicting the settleability of a target activated sludge using the model established in (3);

where, (3) is implemented as follows:
(301) separating, by using the sludge volume index for each of the plurality of activated sludge samples obtained in (2), the plurality of activated sludge samples into a bulking sample set and a non-bulking sample set;
(302) augmenting the bulking sample set or the non-bulking sample set, to equalize the sample sizes between the bulking sample set and the non-bulking sample set;
(303) dividing a dataset for establishing the model into a training set, a validation set, and a testing set, and optimizing hyperparameters of the model;
(304) selecting optimal hyperparameters of the model, training the model to predict the settleability of activated sludge, and assessing the classification performance of the model using the testing set.

In a class of this embodiment, in (1), the raw data of the images of the plurality of activated sludge samples are acquired using a high-throughput image acquisition system, and the raw data of the images is cleaned by removing blurry images and erroneous samples.

In a class of this embodiment, in (2), for each of the plurality of activated sludge samples, the sludge volume index (SVI) is calculated using experimentally determined settled sludge volume (SV) and mixed liquor suspended solids (MLSS) concentration, following a calculation formula:

$$SVI(mL \cdot g^{-1}) = \frac{SV(mL \cdot L^{-1})}{MLSS(g \cdot L^{-1})}.$$

In a class of this embodiment, in (301), a threshold for SVI is defined; when the SVI of the activated sludge falls below the SVI threshold, the activated sludge sample is classified as bulking; otherwise, the activated sludge sample is classified as non-bulking; and the SVI threshold is set within the range of 150 to 190 mL·$g^{-1}$.

In a class of this embodiment, in (302), the augmenting comprises separately rotating the images by 90°, 180°, and 270° for the bulking sample set or the non-bulking sample set.

In a class of this embodiment, in (303), the dataset is split into the training set and the testing set in proportion; during model training process, the training set is further automatically split into an operational training set and a validation set.

In a class of this embodiment, in (303), the hyperparameters of the model are optimized; the hyperparameters comprise an optimizer and a learning rate; the optimizer is stochastic gradient descent; and the learning rate is optimized using the ReduceLROnPlateau callback function, thereby improving the speed of network convergence during training.

In a class of this embodiment, in (304), while training the model to predict the settleability of activated sludge, the loss is calculated using a cross-entropy loss function.

In a class of this embodiment, in (304), when assessing the classification performance of the model using the testing set, four metrics—Accuracy, Precision, Recall, and F1 score are used to measure and analyze the classification capabilities of the model; the formula for calculating Accuracy is as follows:

$$\text{Accuracy} = \frac{TP + TN}{TP + FP + TN + FN}$$

the formula for calculating Precision is as follows:

$$\text{Precision} = \frac{TP}{TP + FP}$$

the formula for calculating Recall is as follows:

$$\text{Recall} = \frac{TP}{TP + FN}$$

the formula for calculating F1 score is as follows:

$$F1\ \text{Score} = \frac{2 \times \text{precision} \times \text{recall}}{\text{precision} + \text{recall}}$$

where TP represents true positives, indicating instances where actual positive samples are correctly predicted as positive; TN represents true negatives, indicating instances where actual negative samples are correctly predicted as negative; FP represents false positives, indicating instances where actual negative samples are incorrectly predicted as positive; FN represents false negatives, indicating instances where actual positive samples are incorrectly predicted as negative.

In a class of this embodiment, the method for applying the model to predict the settleability of activated sludge, the method comprises:
  (401) collecting a plurality of activated sludge samples to be tested; and acquiring, by using a high-throughput image acquisition system, image data of the plurality of activated sludge sample to be tested;
  (402) automatically standardizing the data size of the images for the plurality of activated sludge sample to be tested; and
  (403) inputting the standardized image data of the plurality of activated sludge samples to be tested into the model, generating operational output results, and thereby determining whether the tested activated sludge samples have undergone bulking.

The disclosure relies on the images collected from the activated sludge. After performing essential data cleaning and resizing of image dimensions, the ResNet50 deep neural network is used to establish a binary classification model to predict the bulking of the activated sludge. The binary classification model takes the image data of the activated sludge as input and generates an output that indicates whether the activated sludge has undergone bulking.

The following advantages are associated with the disclosure:
  (1) the disclosed model demonstrates both reliability and efficiency, resulting in accurate outcomes; the input data is readily accessible, leading to a significant reduction in detection time; with the SVI threshold set at 190 mL·g$^{-1}$, the prediction accuracy achieves 92.9%; and
  (2) the disclosed model allows for quick detection and provides a user-friendly experience; and the images are directly employed as input data for model training, thereby removing the necessity for intricate image preprocessing and feature extraction procedures.

BRIEF DESCRIPTION OF THE DRAWINGS

FIG. 5 shows a confusion matrix representing the classification results when an SVI threshold is set at 150 mL·g$^{-1}$ according to the example of the disclosure;

FIG. 6 shows a confusion matrix representing the classification results when an SVI threshold is set at 190 mL·g$^{-1}$ according to the example of the disclosure.

DETAILED DESCRIPTION

To further illustrate the disclosure, embodiments detailing a deep learning-based method for predicting the settleability of activated sludge are described below. It should be noted that the following embodiments are intended to describe and not to limit the disclosure.

Figure 1:
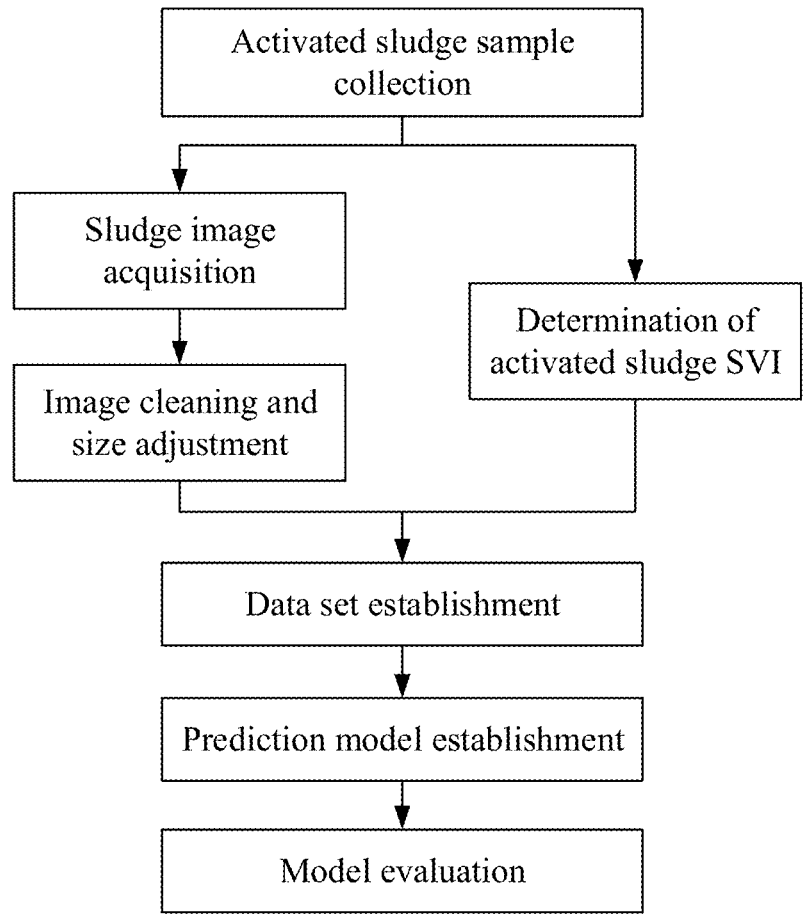
FIG. 1 is a flowchart illustrating a process according to the example of the disclosure.
Figure 2:
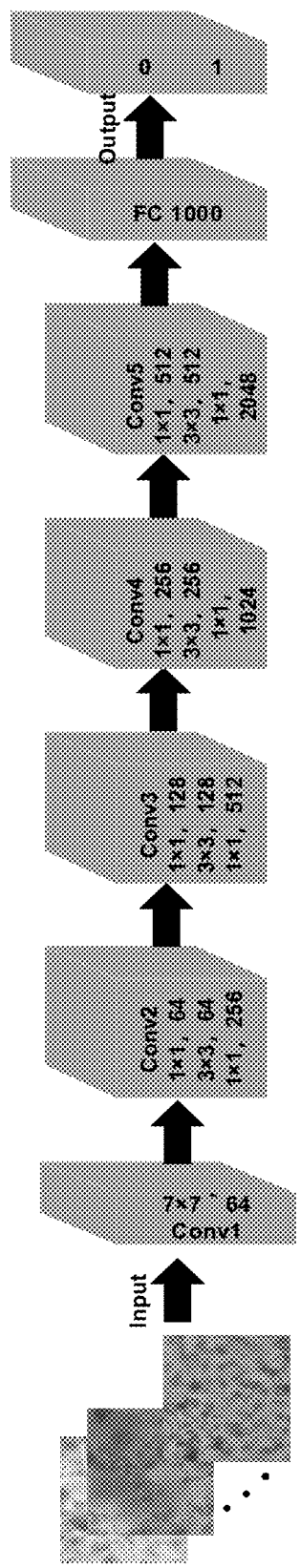
FIG. 2 is a schematic diagram of the structure of the ResNet50 deep neural network according to the example of the disclosure.

As shown in FIG. 1, the disclosure provides a deep learning-based method for predicting the settleability of activated sludge, and the method comprises:
  (1) Sample collection, image acquisition, and image processing:
    sample collection: a plurality of activated sludge samples were collected from aerobic tanks of 41 domestic wastewater treatment plants and stored in a refrigerator at 4° C.; an interval between the sample collection and the image acquisition was limited to a maximum of 24 hours; the plurality of activated sludge samples were diluted at different ratios; specifically, 10 sets of replicates were prepared for original activated sludge samples, samples diluted by a factor of one, and samples diluted by a factor of four; and 100 μL of each replicate was dispensed into an individual well of a 96-well plate;
    image acquisition: the image data of the plurality of activated sludge samples was acquired using the EVOS™ M7000 imaging system; and the images were captured at a 40× magnification, resulting in image dimensions of 26,000×26,000 pixels; and
    image cleaning and image resizing: data cleaning was conducted to remove duplicate and unclear data samples from the acquired image data; furthermore, to maintain uniformity in the input image sizes for the model, all images were resized to dimensions of 288× 288 pixels;
  (2) SVI measurement for activated sludge: 1 μL of a mixture comprising both activated sludge and water was collected from an aeration tank and transferred into a clean 1000 mL·graduated cylinder; the activated sludge was thoroughly mixed with water and allowed to stand for 30 minutes; the scale value V$_0$ (mL) was measured at the interface between the activated sludge layer and the supernatant liquid; and the settled sludge volume(SV) of the activated sludge was calculated using the following formula:

$$SV(\%) = \frac{V_0(\text{mL})}{1000} \times 100\%$$

a 0.45 μm quantitative filter paper was placed into a 105° C. oven until a constant weight is achieved, then cooled, dried, weighed, and recorded as $m_0$; 100 mL of the mixture was taken and filtered through a funnel using the pre-weighed quantitative filter paper; the quantitative filter paper loaded with the activated sludge was placed into the 105° C. oven until a constant weight was achieved, then cooled, dried, weighed, and recorded as mi; and the Mixed Liquor Suspended Solids (MLSS) concentration of the mixture was calculated using the following formula:

$$MLSS(\text{g} \cdot \text{L}^{-1}) = \frac{m_1(\text{g}) - m_0(\text{g})}{0.1(\text{L})}$$

the Sludge Volume Index (SVI) was calculated using the following formula:

$$SVI(\text{mL} \cdot \text{g}^{-1}) = \frac{SV(\text{mL} \cdot \text{L}^{-1})}{MLSS(\text{g} \cdot \text{L}^{-1})}$$

Figure 3:
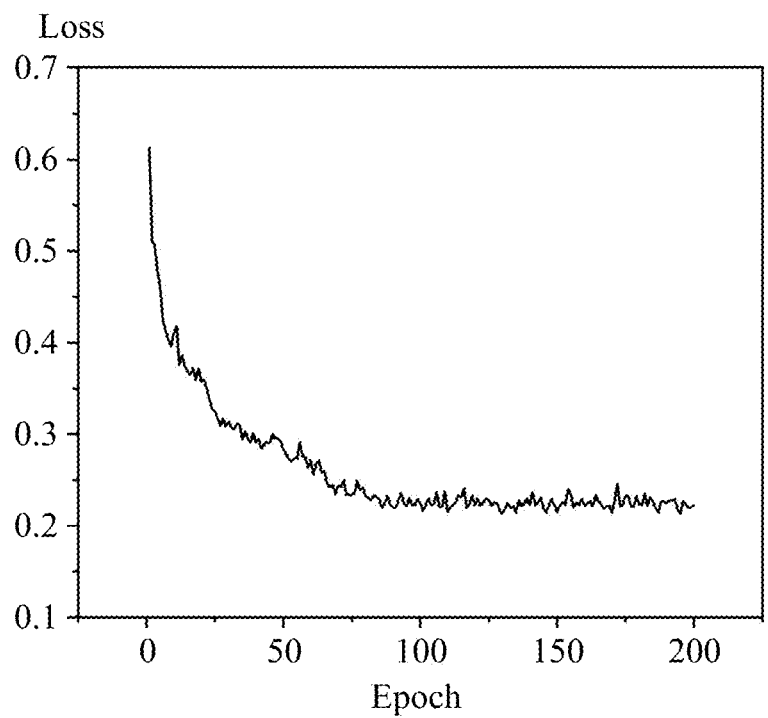
FIG. 3 shows a curve of the loss function during model training with an SVI threshold set at 150 mL·g$^{-1}$ according to the example of the disclosure.
Figure 4:
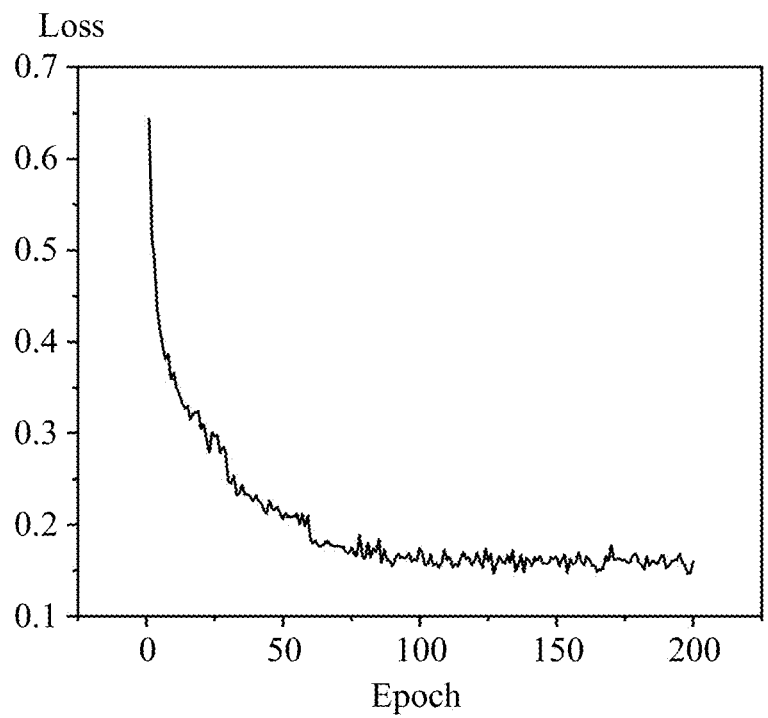
FIG. 4 shows a curve of the loss function during model training with an SVI threshold set at 190 mL·g$^{-1}$ according to the example of the disclosure.

(3) Development of a model using the ResNet50 deep neural network for predicting the settleability of the activated sludge (301) Dataset formation: the image data of the plurality of activated sludge samples was categorized into an bulking sample set and a non-bulking sample set by employing two SVI thresholds of 150 mL·g$^{-1}$ and 190 mL·g$^{-1}$; when SVI was below the set SVI threshold, the activated sludge sample was labeled as non-bulking; when SVI exceeds the set SVI threshold, the activated sludge sample was labeled as bulking; by employing the two SVI thresholds, two models were separately trained to predict whether the activated sludge undergoes bulking; subsequently, the prediction results from the two models were compared;

(302) Data augmentation: due to the limited size of the bulking sample set, potential data imbalance could lead to overfitting; to mitigate the issue and maintain data reliability, the data augmentation comprising rotations of 90°, 180°, and 270° were applied to the samples within the smaller sample set; consequently, a set of 3595 instances of images for the activated sludge samples was generated, forming the foundation for constructing the model;

(303) Dataset splitting: the dataset was split into a training set and a testing set, maintaining an 8:2 ratio; during the model training, the training set was further split into an operational training set and a validation set, maintaining an 8:2 ratio; and (304) Model training: the ResNet50 deep neural network was implemented, using the acquired image data as the input and employing labels denoting whether the activated sludge exhibited bulking as outputs; the hyperparameters were optimized; the optimizer is stochastic gradient descent (SGD), with an initial learning rate of 0.001; the learning rate was fine-tuned using the ReduceLROnPlateau technique to accelerate the network convergence; the model was trained for 200 iterations; subsequently, after identifying the optimal hyperparameters, the training continued to predict the settleability of the activated sludge; during the training process, the cross-entropy loss function (CrossEntropyLoss) was employed, leading to the generation of loss function curves illustrated in FIGS. 3 and 4.

Model evaluation: to evaluate the classification performance of the model, a set of 719 instances of images for the test samples were employed; four metrics—Accuracy, Precision, Recall, and F1 score were used to measure and analyze the classification capabilities of the model; and the formula for calculating Accuracy is as follows $$\text{Accuracy} = \frac{TP + TN}{TP + FP + TN + FN}$$

the formula for calculating Precision is as follows:

$$\text{Precision} = \frac{TP}{TP + FP}$$

the formula for calculating Recall is as follows:

$$\text{Recall} = \frac{TP}{TP + FN}$$

the formula for calculating F1 score is as follows:

$$F1 \text{ Score} = \frac{2 \times \text{precision} \times \text{recall}}{\text{precision} + \text{recall}}$$

where TP represents true positives, indicating instances where actual positive samples are correctly predicted as positive; TN represents true negatives, indicating instances where actual negative samples are correctly predicted as negative; FP represents false positives, indicating instances where actual negative samples are incorrectly predicted as positive; FN represents false negatives, indicating instances where actual positive samples are incorrectly predicted as negative.

Using the trained model on the 719 instances within the test set and setting the SVI threshold at 150 mL·g$^{-1}$, among 169 instances of bulking activated sludge images, 158 instances were categorized as bulking, while 11 instances were categorized as non-bulking based on the predictions. Furthermore, among the 550 instances of non-bulking activated sludge images, 470 instances were identified as non-bulking, while 80 instances were categorized as bulking. The corresponding confusion matrix was depicted in FIG. 5. The results revealed that the model achieved an accuracy level of 87.3%. The following table presented the values for Precision, Recall and F1-score:

| Categories | Precision | Recall | F1 |
| --- | --- | --- | --- |
| Bulking | 0.664 | 0.935 | 0.776 |
| Non-bulking | 0.978 | 0.855 | 0.912 |
| Weighted average | 0.904 | 0.873 | 0.880 |

Using the trained model on the 719 instances within the test set and setting the SVI threshold at 190 mL·g$^{-1}$, among 148 instances of bulking activated sludge images, 129 instances were categorized as bulking, while 19 instances were categorized as non-bulking based on the predictions. Furthermore, among the 571 instances of non-bulking activated sludge images, 539 instances were identified as non-bulking, while 32 instances were categorized as bulking. The corresponding confusion matrix was depicted in FIG. 6. The results revealed that the model achieved an accuracy level of 92.9%. The following table presented the values for Precision, Recall, and F1-score:

| Categories | Precision | Recall | F1 |
| --- | --- | --- | --- |
| Bulking | 0.801 | 0.872 | 0.835 |
| Non-bulking | 0.966 | 0.944 | 0.955 |
| Weighted average | 0.932 | 0.929 | 0.930 |

Figure 7:
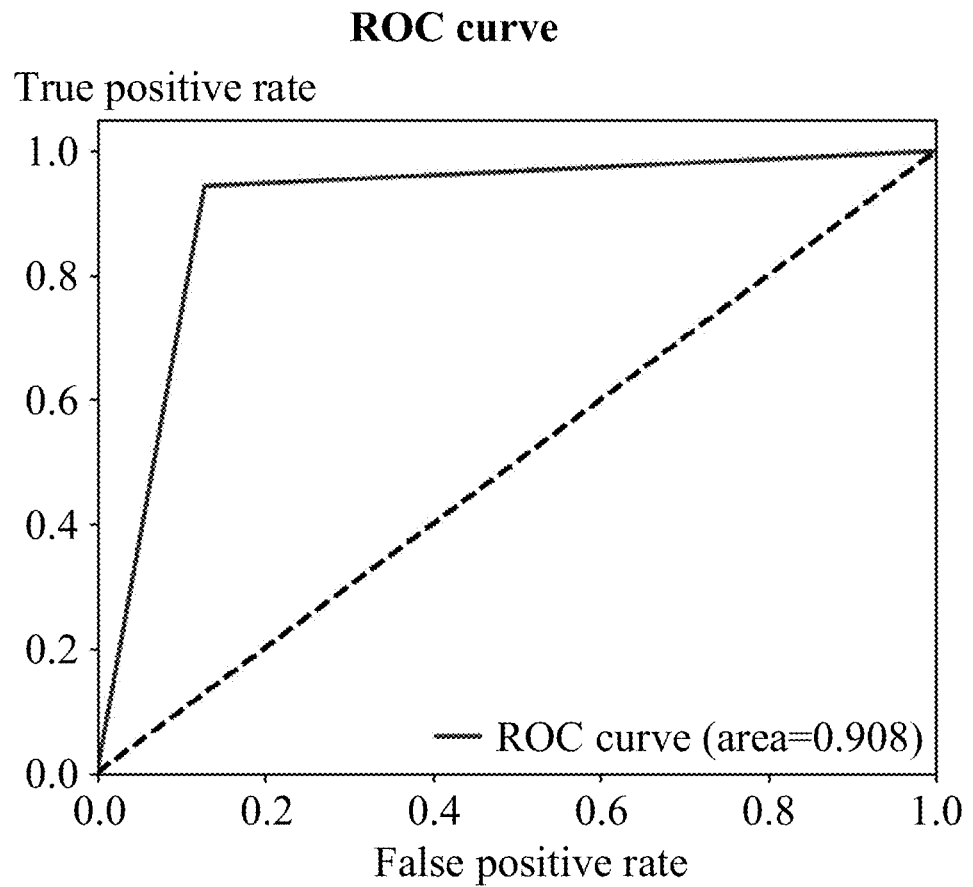
FIG. 7 exhibits the Receiver Operating Characteristic (ROC) curve of the model when an SVI threshold is set at 190 mL·g$^{-1}$ according to the example of the disclosure.

When setting the SVI threshold to 190 mL-g$^{-1}$, the Receiver Operating Characteristic (ROC) curve of the model was depicted in FIG. 7. The Area Under Curve (AUC) value reached 0.908, reflecting a strong level of confidence in the model predictions and a high degree of model reliability.

(4) Prediction of the settleability of the activated sludge in a target wastewater treatment plant:

(401) a plurality of activated sludge samples were collected from a target wastewater treatment plant and processed; the image data of the plurality of activated sludge samples was acquired using the EVOS™ M7000 imaging system, employing the same method as described in 1);

(402) the image data was then cleaned and resized to dimensions of 288×288 pixels, employing the same method as described in 1); and (403) the image data was input into the trained model with an SVI threshold set at 190 mL-g$^{-1}$, producing operational output results; and the classification results for the activated sludge samples indicated the absence of activated sludge bulking.

The disclosure achieves a consistency between the activated sludge categories derived from the model and the real SVI assessments, leading to a prediction accuracy of 92.9%.

It will be obvious to those skilled in the art that changes and modifications may be made, and therefore, the aim in the appended claims is to cover all such changes and modifications.

What is claimed is:

1. A method, comprising:
   (1) collecting a plurality of activated sludge samples, acquiring raw data of images of the plurality of activated sludge samples, cleaning the raw data of the images, and standardizing data sizes of the images;
   (2) calculating a sludge volume index (SVI) for each of the plurality of activated sludge samples;
   (3) establishing, by using a ResNet50 deep neural network, a model for predicting the settleability of activated sludge; and
   (4) predicting the settleability of a target activated sludge using the model established in (3);
   wherein, (3) is implemented as follows:
   (301) separating, by using the sludge volume index for each of the plurality of activated sludge samples obtained in (2), the plurality of activated sludge samples into a bulking sample set and a non-bulking sample set;
   (302) augmenting the bulking sample set or the non-bulking sample set, to equalize the sample sizes between the bulking sample set and the non-bulking sample set;
   (303) dividing a dataset for establishing the model into a training set, a validation set, and a testing set, and optimizing hyperparameters of the model;
   (304) selecting optimal hyperparameters of the model, training the model to predict the settleability of activated sludge, and assessing a classification performance of the model using the testing set.

2. The method of claim 1, wherein in (1), the raw data of the images of the plurality of activated sludge samples are acquired using a high-throughput image acquisition system, and the raw data of the images is cleaned by removing blurry images and erroneous samples.

3. The method of claim 1, wherein in (2), for each of the plurality of activated sludge samples, the sludge volume index (SVI) is calculated using experimentally determined settled sludge volume (SV) and mixed liquor suspended solids (MLSS) concentration, following a calculation formula:

$$SVI(\text{mL} \cdot \text{g}^{-1}) = \frac{SV(\text{mL} \cdot \text{L}^{-1})}{MLSS(\text{g} \cdot \text{L}^{-1})}.$$

4. The method of claim 1, wherein in (301), a threshold for SVI is defined; when the SVI of the activated sludge falls below the SVI threshold, the activated sludge sample is classified as bulking; otherwise, the activated sludge sample is classified as non-bulking; and the SVI threshold is set within the range of 150 to 190 mL·g$^{-1}$.

5. The method of claim 1, wherein in (302), the augmenting comprises separately rotating the images by 90°, 180°, and 270° for the bulking sample set or the non-bulking sample set.

6. The method of claim 1, wherein in (303), the dataset is split into the training set and the testing set in proportion; during model training process, the training set is further automatically split into an operational training set and a validation set.

7. The method of claim 1, wherein in (303), the hyperparameters of the model are optimized; the hyperparameters comprise an optimizer and a learning rate; the optimizer is stochastic gradient descent; and the learning rate is optimized using a ReduceLROnPlateau callback function, thereby improving a speed of network convergence during training.

8. The method of claim 1, wherein in (304), while training the model to predict the settleability of activated sludge, a loss is calculated using a cross-entropy loss function.

9. The method of claim 1, wherein in (304), when assessing the classification performance of the model using the testing set, four metrics—Accuracy, Precision, Recall, and F1 score are used to measure and analyze classification capabilities of the model; the formula for calculating Accuracy is as follows:

$$\text{Accuracy} = \frac{TP + TN}{TP + FP + TN + FN};$$

the formula for calculating Precision is as follows:

$$Precision = \frac{TP}{TP+FP}$$

the formula for calculating Recall is as follows:

$$Recall = \frac{TP}{TP+FN}$$

the formula for calculating F1 score is as follows:

$$F1\ Score = \frac{2 \times precision \times recall}{precision + recall};$$

where TP represents true positives, indicating instances where actual positive samples are correctly predicted as positive; TN represents true negatives, indicating instances where actual negative samples are correctly predicted as negative; FP represents false positives, indicating instances where actual negative samples are incorrectly predicted as positive; FN represents false negatives, indicating instances where actual positive samples are incorrectly predicted as negative.

10. The method of claim 1, wherein (4) is implemented as follows:
- (401) collecting a plurality of activated sludge samples to be tested; and acquiring, by using a high-throughput image acquisition system, image data of the plurality of activated sludge sample to be tested;
- (402) automatically standardizing the data sizes of the images for the plurality of activated sludge sample to be tested; and
- (403) inputting standardized image data of the plurality of activated sludge samples to be tested into the model, generating operational output results, and thereby determining whether the tested activated sludge samples have undergone bulking.

* * * * *